(No Model.)

W. LEESE.
ANIMAL TRAP.

No. 267,004. Patented Nov. 7, 1882.

Attest:
T. Walter Fowler
E. J. Redmond

Inventor:
Wm Leese
per Attorneys
A. H. Evans & Co.

UNITED STATES PATENT OFFICE.

WILLIAM LEESE, OF SEWARD, NEBRASKA.

ANIMAL-TRAP.

SPECIFICATION forming part of Letters Patent No. 267,004, dated November 7, 1882.

Application filed August 26, 1882. (No model.)

*To all whom it may concern:*

Be it known that I, WILLIAM LEESE, a citizen of the United States, residing at Seward, in the county of Seward, State of Nebraska, have invented certain new and useful Improvements in Animal-Traps, of which the following is a full, clear, and exact description, reference being had to the accompanying drawings, forming a part of this specification, in which—

Figure 1:
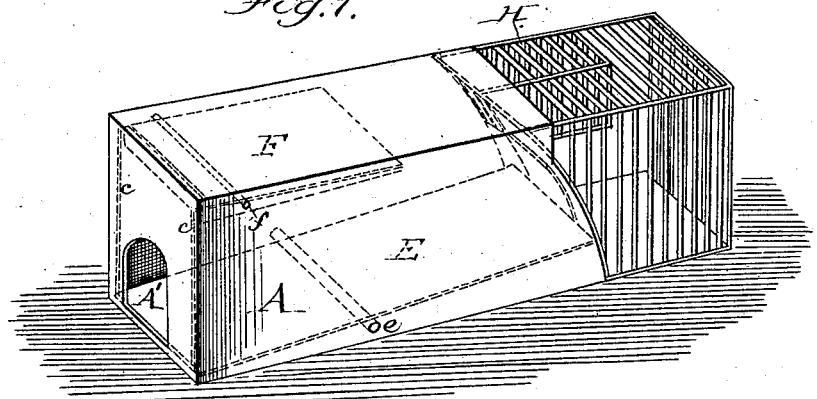
Figure 2:
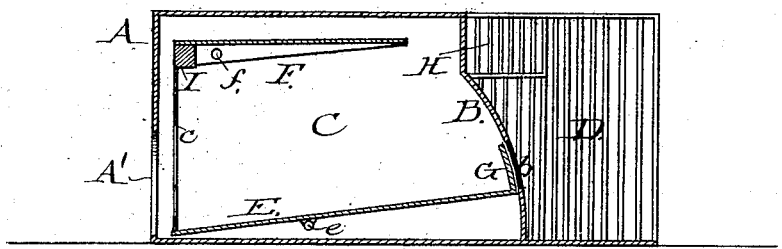
Figure 3:
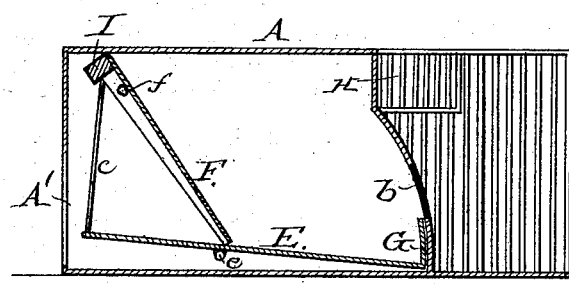
Figure 4:
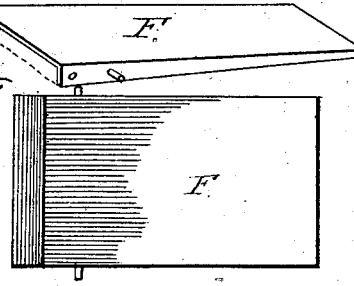

Figure 1 is a perspective view of an animal-trap with my improvements attached. Fig. 2 is a side view, partially broken away. Fig. 3 is a vertical longitudinal section of the same. Fig. 4 are details to be referred to.

My invention relates to that class of animal-traps known as "self-setting traps," by which animals are caught by reason of their own weight bearing down the end of an oscillating platform; and it consists in the combination of devices hereinafter explained and claimed.

To enable others skilled in the art to make and use my invention, I will proceed to describe the exact manner in which I have carried it out.

In the drawings, A represents the outer boxing of the trap, provided with a door, A'. Within the box A is a concave partition, B, dividing the box into two compartments, C and D. Through the partition B is an opening, $b$, for a purpose hereinafter to be described. Lengthwise in the compartment, C, I arrange the platform E, pivoted at $e$, so as to oscillate on its pivot, and with its short end extending toward the door A', and weighted from above, so that the normal condition of the platform will be with its front end on the floor and its rear end raised, as shown in Fig. 2. Extending from the front corners of this platform upward are the rods $c\ c$, attached at their upper ends to the door F, which door is pivoted at $f$. It is evident from this direction that when the front end of the oscillating platform rises, carrying with it rods $c\ c$, the rods will force one end of the pivoted door up, and force the opposite end down on the platform, as shown in Fig. 3, thus closing up the compartment C.

The operation of this portion of my invention is as follows: The animal passing through the door A' passes along the oscillating platform E until it has passed the pivotal point $e$, when the rear end of the platform is caused to descend by the weight of the animal, and in its descent throws up the other end with the rods $c$, and closes the door F in the rear of the animal, which is thus entrapped. As the rear end of the platform E descends it carries with it the concave plate G, which previously had covered the opening $b$, thus exposing the opening $b$ and allowing the animal to pass into the compartment D, when the forward and heavier end of the platform will again fall to its normal position, and the rods $c\ c$ will cause the pivoted door F to rise to its normal position, as shown in Fig. 2.

Within the compartment D is secured the bait-box H, constructed to expose the bait to the animals on the outside of the trap, as well as to those entering the trap.

To the forward portion of the pivot-door F, I attach the counterpoise I to assist in raising the door up during the descent of the forward portion of the oscillating platform, and to aid the descent.

I am aware that oscillating platforms for self-setting traps are not broadly new, nor do I claim such as my invention.

I am also aware that it is not new to operate the swinging door of an animal-trap by means of the oscillating platform, and I do not claim such broadly as my invention.

Having thus explained my invention, what I claim as new, and desire to secure by Letters Patent, is—

In a self-setting animal-trap, the oscillating platform E, provided at its rear end with the curved plate or door G and on its front with the connecting-rods $c\ c$, in combination with the swinging door F, provided with the weight I, the curved partition B, provided with the opening $b$, and the chamber D, provided with the bait-box H, all constructed and arranged to operate substantially as and for the purpose set forth.

WILLIAM LEESE.

Witnesses:
S. C. LANGWORTHY,
A. P. WINSOR.